United States Patent [19]

Schwob

[11] 4,286,272

[45] Aug. 25, 1981

[54] INK JET PRINTER AND START UP METHOD THEREFOR

[75] Inventor: Charles J. Schwob, Kettering, Ohio

[73] Assignee: The Mead Corporation, Dayton, Ohio

[21] Appl. No.: 65,786

[22] Filed: Aug. 13, 1979

[51] Int. Cl.³ .............................................. G01D 15/18

[52] U.S. Cl. .................................. 346/75; 346/140 R

[58] Field of Search .................................. 346/75, 140

[56] References Cited

U.S. PATENT DOCUMENTS

| | | | |
|---|---|---|---|
| 3,618,858 | 11/1971 | Culp | 346/75 X |
| 3,839,721 | 10/1974 | Chen | 346/75 |
| 3,891,121 | 6/1975 | Stoneburner | 346/75 X |
| 4,042,937 | 8/1977 | Perry | 346/75 X |
| 4,081,804 | 3/1978 | Van Breemen | 346/75 |

OTHER PUBLICATIONS

Helenski, E. F.; Start Up/Turn Off System For INR Jet Printer; IBM TDB vol. 17, No. 2, Jul. 1974, pp. 370-371.

Brady et al.; Fluid Circuit for Fast Startup of an INR Jet Head; IBM TDB vol. 17, No. 5, Oct. 1974, p. 1524.

Mix, A. L. Jr.; Charge Electrode Alignment and Retraction; IBM TDB vol. 20, No. 1, Jun. 1977, pp. 33-34.

Krause, K. A.; INR Jet Head IBM TDB vol. 19, No. 8, Jan. 1977, pp. 3216-3217.

*Primary Examiner*—Joseph W. Hartary

*Attorney, Agent, or Firm*—Biebel, French & Nauman

[57] ABSTRACT

An ink jet printer for depositing ink drops on a print receiving medium includes a print head having a fluid receiving reservoir and including an orifice plate defining a row of orifices through which ink from the reservoir passes to form a row of downward extending fluid filaments. The fluid filaments are stimulated to cause break up of each filament into a jet drop stream. A charge electrode plate is positioned beneath the print head and to one side of the row of fluid filaments. The charge electrode plate includes a plurality of charge electrodes with each of the electrodes being positioned adjacent a respective one of the fluid filaments and spaced therefrom by a predetermined distance. An ink supply inlet supplies ink to the fluid receiving reservoir in a direction substantially perpendicular to the row of orifices and to the fluid filaments. The ink supply inlet is positioned on the same side of the fluid filaments as the charge electrode plate. An ink supply outlet removes ink from the fluid receiving reservoir in a direction substantially perpendicular to the row of orifices and to the fluid filaments. The ink supply outlet is positioned on the side of the fluid filaments opposite the ink supply inlet. A valve arrangement supplies fluid to the reservoir at start up of the printer such that a fluid flow across the row of orifices from the inlet to the outlet produces a velocity component in each of the fluid filaments which deflects the filaments outward from their associated charge electrodes. Outward deflection of the filaments prevents wetting of the charge electrodes at start up of the printer.

12 Claims, 8 Drawing Figures

INK JET PRINTER AND START UP METHOD THEREFOR

BACKGROUND OF THE INVENTION

The present invention relates to ink jet printers of the type which deposit ink drops from one or more jet drop streams on a print receiving medium and, more particularly, to a printer arrangement in which start up of the printer is enhanced.

Typically, an ink jet printer includes a print head defining a fluid reservoir to which electrically conductive ink is supplied under pressure. A plurality of orifices are defined by an orifice plate, with each of the orifices communicating with the fluid reservoir. Ink is forced through the orifices and emerges as a plurality of fluid filaments. Varicosities are generated in the fluid filaments by mechanical stimulation of the orifice plate or by pressure waves which travel through the ink in the fluid reservoir and are coupled to the filaments. The filaments are thereby caused to break up into streams of ink drops of substantially uniform size and spacing.

A plurality of charge electrodes are positioned beneath the orifice plate, with each of the electrodes being adjacent the end of one of the fluid filaments. Charge potentials, selectively applied to the charge electrodes induce corresponding charges on the drops formed from the filament tips. The charged and uncharged drops then pass downwardly through a deflection field, with the charged drops being deflected and the uncharged drops passing unaffected through the field. A drop catcher is positioned adjacent the jet drop streams generated by the print head and cooperates with a deflection electrode to produce a deflection field when a deflection potential is applied between the deflection electrode and the catcher.

A number of problems are encountered at the initiation of operation of an ink jet printer. At start up of such a printer, both the fluid flow through the orifices and the formation of drops from the fluid filaments are extremely irregular and unpredictable. Exceptionally large drops of ink may be formed from the filaments and the trajectories of the drops are relatively uncontrolled. As a consequence, large amounts of ink may be deposited upon the charge electrodes, with the result that the charge electrodes may be shorted.

Several approaches have been taken in order to prevent deposition of ink upon the charge electrode structure at start up of an ink jet printer. In *IBM Technical Disclosure Bulletin,* Vol. 20, No. 1, June 1977, pp. 33 and 34, a charge electrode structure is shown in which a notched charge electrode plate is pivoted or, alternatively, translated into position adjacent the jet drop streams after start up to reduce wetting of the charged electrodes by the unstable jet drop streams which occur during start up. *IBM Technical Disclosure Bulletin,* Vol. 19, No. 8, January 1977, pp. 3216 and 3217, discloses a similar arrangement for laterally shifting a pair of charge electrode plates into and out of their operating positions after start up and prior to shut down, respectively.

U.S. Pat. No. 3,618,858, issued Nov. 9, 1971, to Culp, discloses a notched charge electrode plate which is moved away from a row of fluid filaments at start up until after a stable jet drop stream configuration is obtained. The charge electrode plate is then moved into its operating position in which each of the electrode notches partially surrounds its associated fluid filament.

By withdrawing the charge electrode plate from the row of jet drop streams, wetting of the plate and shorting of the charge electrodes is prevented.

U.S. Pat. No. 3,839,721, issued Oct. 1, 1974, to Chen et al, discloses an ink jet printer having a row of nozzles and a plurality of associated U-shaped charge electrodes which are moved into their respective operating positions after start up of the printer and stabilization of the jets.

While movement of the charge electrode structure into operating position after start up of the jets provides a means of keeping the charge electrodes free of ink, the apparatus required for moving the charge electrode structure unduly complicates the printer. Additionally, after repeatedly moving the charge electrode structure into and out of its operating position, the structure may eventually become misaligned with the result that proper charging of the drops in all of the jet drop streams is not accomplished. Finally, in systems where the jet drop streams are stabilized prior to movement of the charge electrodes into their operating positions, it will be appreciated that the drops formed during start up cannot be charged and that these drops will therefore pass downward, striking the print receiving medium.

In order to prevent undue wetting of the print receiving medium at start up, printers such as disclosed in the above identified *IBM Technical Disclosure Bulletin,* Vol. 19, have incorporated catcher structures which are moved into a position at start up such that they intercept the drops. As shown in U.S. Pat. No. 4,081,804, issued Mar. 28, 1978, to Van Breeman et al, it is known to mount the print head above a drip pan at start up to collect drops formed from the fluid filaments until the jets become stable. A print receiving medium is thereafter positioned above the drip pan, and printing is initiated. While these printers provide a means of handling the drops produced by the unstable fluid filaments at start up, they also require substantial additional structure to dispose of such drops.

Accordingly, it is seen that there is a need for a simple ink jet printer construction in which the deposit of drops on the charge electrode structure from unstable jets at printer start up is prevented and in which fluid from the jet drop streams at start up is prevented from striking the print receiving medium.

SUMMARY OF THE INVENTION

An ink jet printer for depositing ink drops on a print receiving medium includes a print head means having a fluid receiving reservoir. The print head means includes an orifice plate defining a row of orifices through which fluid from the reservoir passes to form a row of downward extending fluid filaments. A means is provided for stimulating the fluid filaments to cause each of the fluid filaments to break up into a jet drop stream. A charge electrode plate is positioned beneath the print head means and to one side of the row of fluid filaments. The charge electrode plate includes a plurality of charge electrodes, with each of the electrodes positioned adjacent a respective one of the fluid filaments and spaced therefrom by a predetermined distance.

An ink supply inlet means supplies ink to the fluid receiving reservoir in a direction substantially perpendicular to the row of orifices and to the fluid filaments. The ink supply inlet means is positioned on the same side of the fluid filaments as the charge electrode plate.

An ink supply outlet means removes ink from the fluid receiving reservoir in a direction substantially perpendicular to the row of orifices and to the fluid filaments. The ink supply outlet means is positioned on the side of the fluid filaments opposite the ink supply inlet means. A means is provided for selectively applying charging potentials to the plurality of charge electrodes such that drops in the jet drop streams are selectively charged. A means is provided for producing a drop deflection field through which the jet drop streams pass such that drops in the jet drop streams are separated into catch and print trajectories. A means for catching drops in the catch trajectories permits drops in the print trajectories to strike the print receiving medium. A fluid supply control means controls the application of fluid to and removal of fluid from the fluid reservoir whereby fluid flow across the row of orifices from the inlet means to the outlet means is provided at start up of the printer to deflect the filaments away from the charge electrodes by a distance greater than the predetermined distance. Fluid flow across the row of orifices is terminated after start up, such that the fluid filaments are thereafter spaced from the electrodes by the predetermined distance.

The means for catching drops may be positioned on the side of the fluid filaments opposite the charge electrode plate, whereby deflection of filaments at start up causes drops formed therefrom to be directed to the means for catching drops. The printer may further comprise a source of ink, a source of start air, and a source of dry air, with the fluid supply control means comprising a first valve means for connecting the source of ink, the source of start air, and the source of dry air to the ink supply inlet means.

The ink jet printer may further comprise a cross flush conduit providing restricted flow of ink therethrough, and an exhaust conduit. The fluid supply control means further includes a second valve means for connection the cross flush conduit and the exhaust conduit to the ink supply outlet means.

Accordingly, it is an object of the present invention to provide an ink jet printer having a fluid reservoir and at least one orifice communicating therewith in which fluid flow is provided through the reservoir across the orifice such that a velocity component is provided for the ink filament emerging from the orifice which deflects the filament away from a charge electrode; to provide such a printer in which a plurality of orifices, arranged in a row, communicate with the fluid reservoir and in which fluid flow at start up is substantially perpendicular to the row of orifices; to provide such a printer in which a drop catcher is positioned such that drops formed from deflected fluid filaments at start up are directed to strike the catcher; and to provide such a printer in which the flow of ink across the fluid reservoir is terminated after start up of the printer.

Other objects and advantages of the invention will be apparent from the following description, the accompanying drawings and the appended claims.

DETAILED DESCRIPTION OF THE PREFERRED EMBODIMENT

Figure 1:
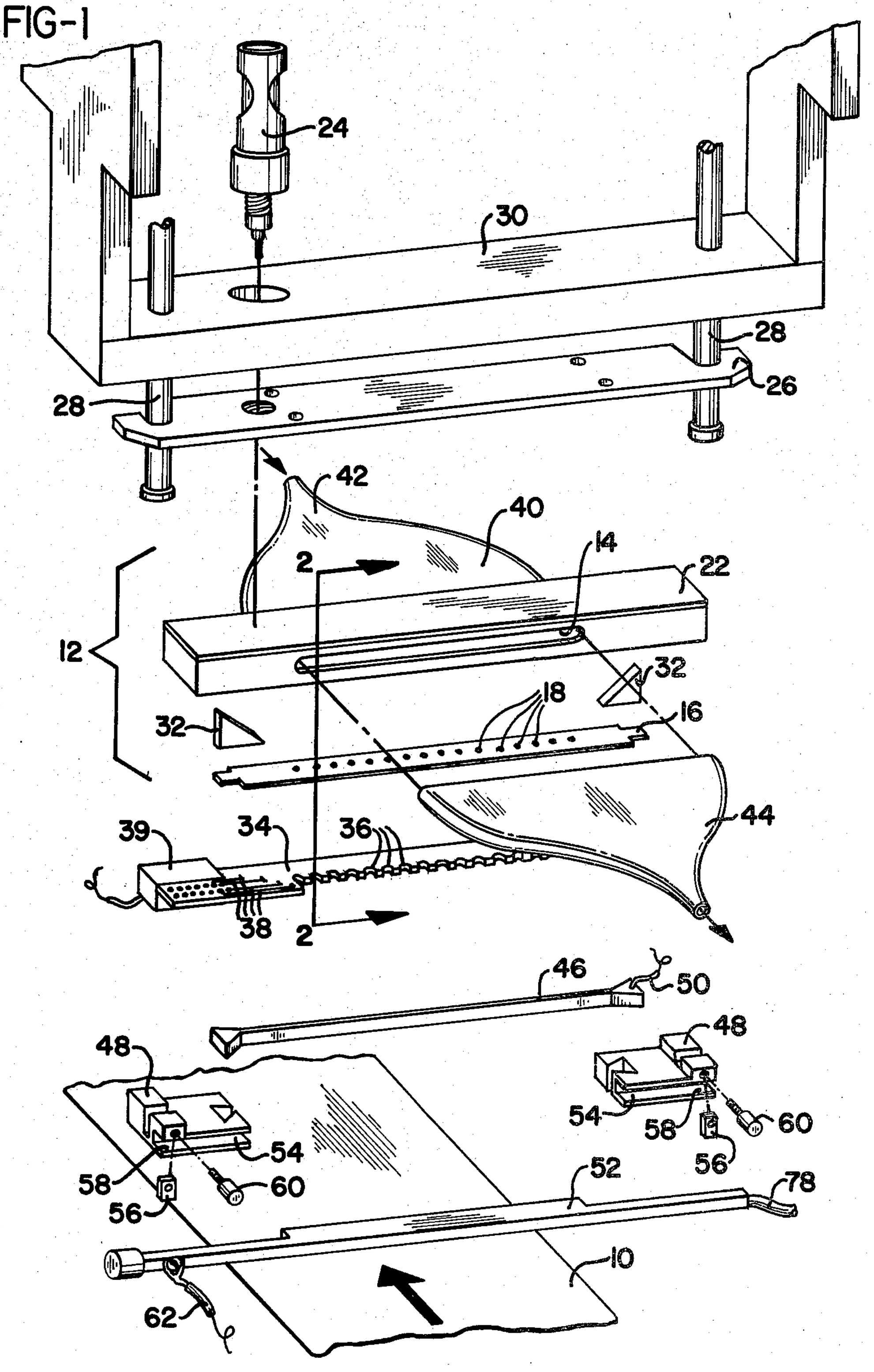
FIG. 1 is an exploded perspective view of an ink jet printer constructed according to the present invention.
Figure 2:
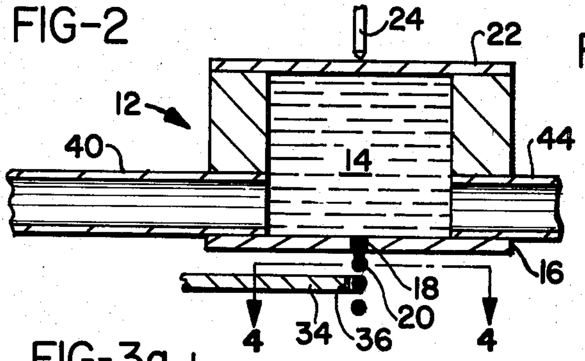
FIG. 2 is an enlarged sectional view taken generally along line 2—2 in FIG. 1.

Reference is now made to FIGS. 1 and 2, showing an ink jet printer constructed according to the present invention which deposits ink drops on a print receiving medium such as web 10 which may be a moving paper web. A print head means 12 defines a fluid receiving reservoir 14 and includes an orifice plate 16 having a row of orifices 18 through which ink from the reservoir 14 passes to form a row of downward extending fluid filaments 20. A flexible diaphragm plate 22 is mounted on the top of the print head means 12 and is contacted by a piezoelectric stimulator 24 which, when actuated, generates a series of waves which travel along diaphragm plate 22. These traveling waves are coupled through the fluid in reservoir 14 to each of the fluid filaments 20. Transducer 24 provides a means for stimulating fluid filaments to cause the filaments to break up into jet drop streams. The print head means 12 is attached to support bar 26 by means of screws (not shown). Bar 26 engages rods 28 which are mounted in support frame 30 which also supports transducer 24. Dampers 32 are positioned in each end of the reservoir 14 and provide acoustic damping of the traveling waves which move along the diaphragm 22 to prevent wave reflections which would otherwise interfere with stimulation of the filaments.

Figure 4:
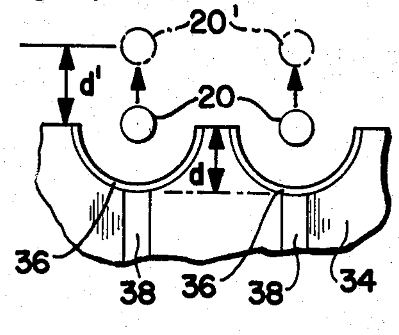
FIG. 4 is an enlarged view taken generally along line 4—4 in FIG. 2 illustrating the outward deflection of the fluid filaments away from the charge electrodes.
Figure 3A:
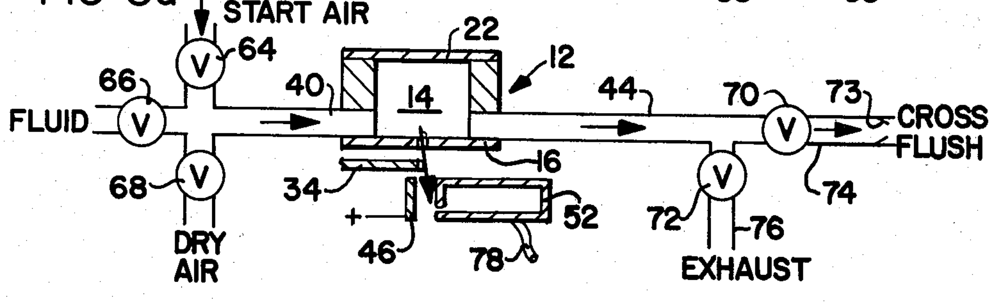
FIGS. 3*a*, 3*b*, and 3*c* are views similar to FIG. 2, illustrating the sequence of valve actuation at start up.
Figure 3B:
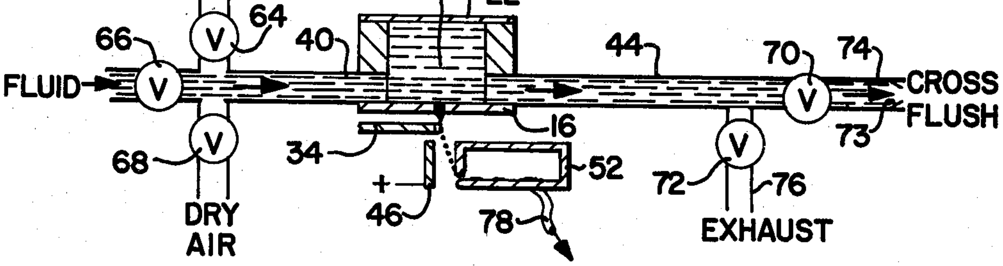
Figure 3C:
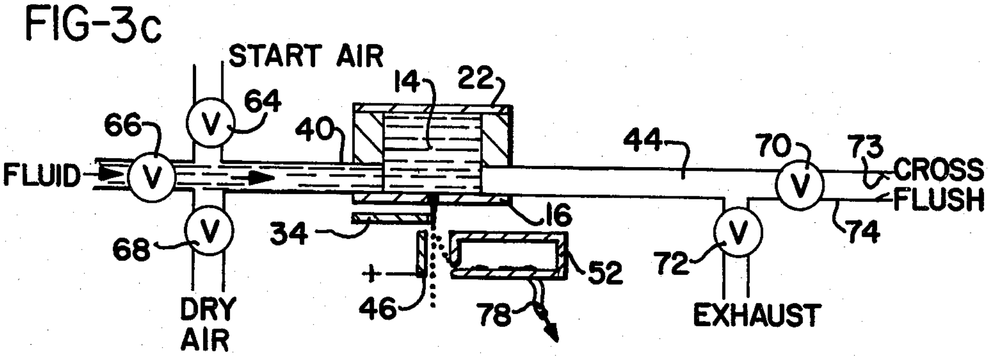

A charge electrode plate 34 is positioned beneath the print head means 12 and to one side of the row of fluid filaments 20 which emerge through orifices 18. Plate 34 includes a plurality of charge electrodes 36 which may each comprise a lining of conductive materials within one of a plurality of notches in non-conductive plate 34. Conductors 38 may be printed on the surface of plate 34 by means of printed circuit techniques to provide electrical connection between connector 39 and charge electrodes 36. Connector 39 provides a means of connecting each of the charge electrodes 36 to a source of charge potential, such as a data processing device or an optical scanning arrangement for scanning a document. Each of the charge electrodes 36 is positioned adjacent a respective one of the fluid filaments 20 and, during normal operation of the printer, is spaced therefrom by a predetermined distance d (FIG. 4).

An ink supply inlet means 40 supplies ink to the fluid receiving reservoir 14 in a direction substantially perpendicular to the row of orifices 18 and to the fluid filaments 20. The ink supply inlet means 40 is positioned on the same side of the fluid filaments 20 as the charge electrode plate 34. The ink supply inlet means 40 comprises a fluid conduit which is substantially wider at the point of connection to the print head means 12 than at end 42. This widened configuration provides for fluid flow across each of the orifices 18 in the orifice plate 16. It will be appreciated that the fluid velocity at the point at which the fluid enters reservoir 14 is a function both of the velocity of the fluid entering the inlet means at end 42 and also of the ratio of the cross-sectional areas of the inlet means 40 at end 42 and at the point where the fluid enters the fluid reservoir 14.

An ink supply outlet means 44, generally similar in shape to the ink supply inlet means 40, is provided for removing ink from the fluid receiving reservoir 14 in a direction substantially perpendicular to the row of orifices 18 and to the fluid filaments 20. The ink supply outlet means is positioned on the side of the fluid filaments opposite the ink supply inlet means 40. The inlet means 40 and outlet means 44 are substantially aligned for fluid flow therebetween past the orifices 18 during start up of the printer, as is described more completely below.

A means for providing a drop deflection field through which the jet drop streams pass includes a deflection electrode 46 which may comprise a thin strip or ribbon of conductive material. Deflection electrode 46 is mounted in non-conductive support blocks 48 and receives a deflection potential via line 50. The deflection potential applied to electrode 46 is of the same polarity as the charges induced in the drops in the jet drop streams such that charged drops are deflected away from the electrode 46, thus separating the drops into catch and print trajectories. The uncharged drops in the jet drop streams pass unaffected through the deflection field and strike the print receiving medium 10, while charged drops are deflected outwardly from the electrode 46 to a catcher 52 which provides a means for catching drops in the catch trajectories.

Catcher 52 is received within slots 54 and urged toward the electrode 46 by means of a spring arrangement (not shown). Adjusting blocks 56 are inserted through openings 58 in support block 48 and cooperate with adjusting screws 60 to urge the catcher 52 outward against the spring force. Consequently, screws 60 provide a means for adjusting the position of the catcher 52 with respect to the electrode 46. The catcher structure may be of the type shown in U.S. Pat. No. 3,701,998, issued Oct. 31, 1972, to Mathis, in which drops striking the catcher are ingested into a cavity within the catcher by means of a partial vacuum supplied to the cavity. Conductor 62 provides a means for grounding the catcher 52, which is typically formed of conductive material. Thus, the deflection field extends generally perpendicular to the row of jet drop streams from the electrode 46 to the catcher 52.

A fluid supply control means, illustrated in FIGS. *3a–3b,* controls application of ink to and removal of ink from the fluid reservoir 14, such that fluid flow across the row of orifices 18 from the inlet means 40 to the outlet means 44 is provided at start up of the printer. This fluid flow deflects filaments 20 away from the charge electrodes by a distance greater than the predetermined distance d. As seen in FIG. 4, at start up each of the fluid filaments 20 is deflected outward from the charge electrode plate 34 by a distance d' to the positions indicated at 20'. This outward deflection results from the fact that cross flushing of the ink in the reservoir 14 imparts a lateral velocity component to the fluid which forms the fluid filaments 20. It has been found that at least a 7° outward deflection of the jets may be obtained by this technique. This results in an outward deflection d' of approximately 0.0025 inch, or 0.006 cm., in a typical ink jet printer. By deflecting the fluid filaments and the jet drop streams outward from the charge electrodes, drops produced from the unstable jets at start up are directed away from the charge electrode plate, thus minimizing the possibility of flooding of the plate with conductive ink and shorting of the charge electrodes.

As seen in FIGS. *3a–3c,* the fluid supply control means includes a first valve means consisting of valves 64, 66, and 68. Valve 64 is provided for connecting the inlet 40 to a pressurized source of start air. Valve 66, when actuated, connects an ink supply, providing ink under pressure, to inlet 40. Similarly, valve 68 connects inlet 40 to a source of dry air, which air is provided at substantially lower pressure than the start air.

The fluid supply control means further comprises a second valve means, consisting of valves 70 and 72 which are connected to the fluid outlet 44. Valve 70 is a cross flush valve which connects the outlet 44 to a cross flush conduit 74 which, if desired, may return ink to an ink supply tank for recirculation to the print head via fluid valve 66. Cross flush conduit 74 includes a flow restrictor segment, illustrated at 73, which limits the fluid flow therethrough in order to maintain a back pressure in reservoir 14. Valve 72 connects outlet 44 to an exhaust conduit 76, which contains no such flow restriction, in order to permit the reservoir 14 to be emptied rapidly at shut down of the printer.

The steps for start up and shut down of the printer are illustrated in FIGS. *3a–3c,* and in the valve timing diagram illustrated in FIG. *5a* and a pressure diagram illustrated in FIG. *5b.* Printer operation is initiated at time t1 with simultaneous action of start air valve 64 and cross flush valve 70. As shown in FIG. *3a,* the pressurized start air flows through the fluid reservoir 14 from inlet 40 and out through both orifices 18 and the outlet 44. After the reservoir 14 is pressurized and air flow established, the fluid valve 66 is opened at time t2, permitting pressurized ink from an ink supply tank to be supplied to inlet 40. Shortly thereafter, at time t3, the start air valve 64 is closed. Valves 64 and 66 are not actuated sequentially to prevent the occurrence of sharp pressure impulses in the inlet 40. Ink from the inlet 40 is supplied to reservoir 14 and flows across the orifices 18 and exits through outlet 44. The cross flushing of ink through the reservoir 14 imparts a velocity component to the fluid jets which deflects the initially unstable jets outward from the charge plate 34.

If desired, the catcher 52 may be positioned as illustrated in FIGS. *3a–3c* such that the unstable jets strike the catcher 52 and are withdrawn therefrom by suction line 78. In order to accomplish removal of the fluid from the unstable jets in this manner, the catcher 52 is positioned on the side of the fluid filaments 20 opposite the charge electrode plate 34. Alternatively, the catcher 52 may be positioned on the other side of the row of jets, beneath the charge plate 34, with the deflection electrode 46 being spaced outwardly from the jets by a sufficient distance such that deflected jets at start up do not strike the electrode. With such an arrangement, a drip pan or other drop catching arrangement must be provided beneath the printer to collect ink from the unstable jets at start up of the printer.

After the cross flushing operation has occurred for a time sufficient to produce stable jet drop streams, the cross flush valve 70 is closed at time t4, as illustrated in FIG. *3c,* and normal printing operation is initiated. The jets then assume their proper operating positions, as illustrated in FIG. *3c,* with the fluid filaments being spaced from associated charge electrodes by a predetermined distance such that drops may be selectively charged and deflected for printing on the print receiving medium.

Figure 5A:
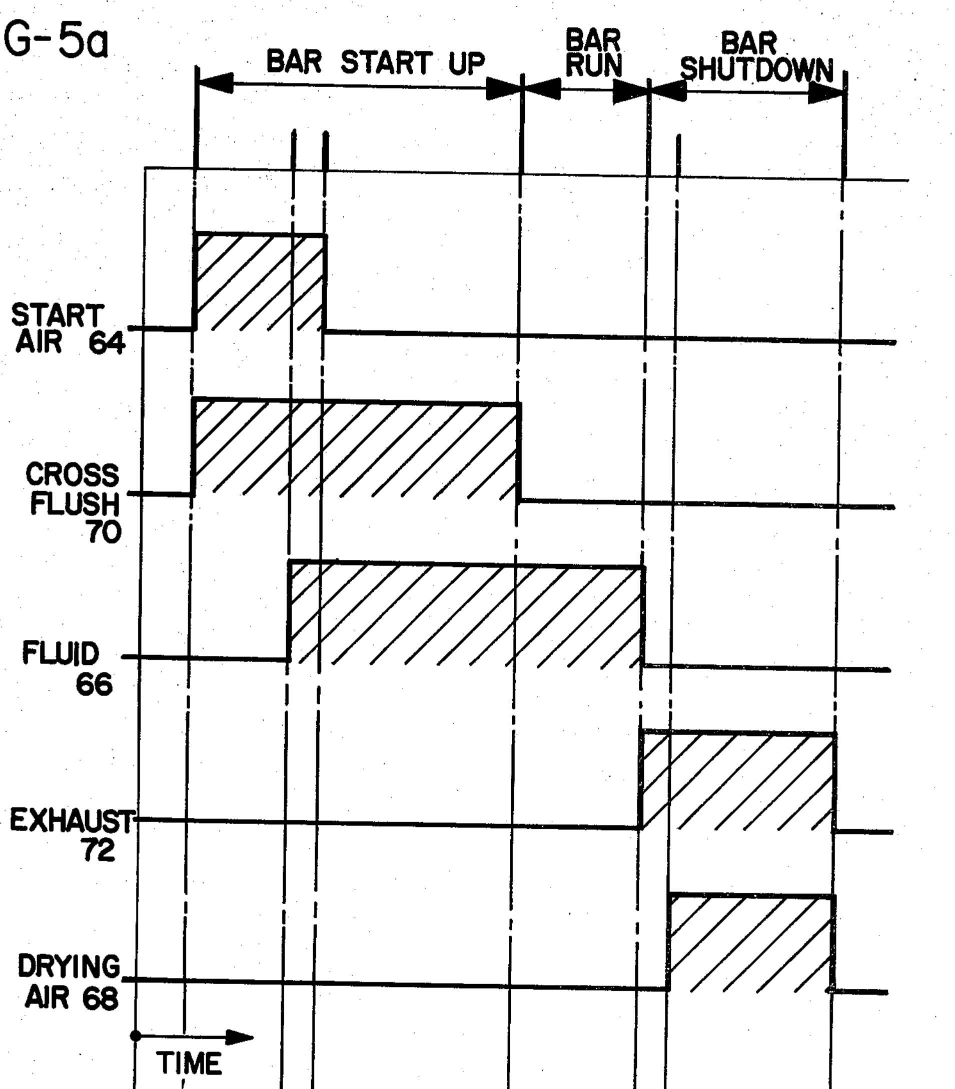
FIGS. 5*a* and 5*b* are timing and pressure diagrams, respectively, illustrating the actuation of the valves controlling application of ink and air to the fluid reservoir and the effect of such valve actuations upon reservoir pressure.
Figure 5B:
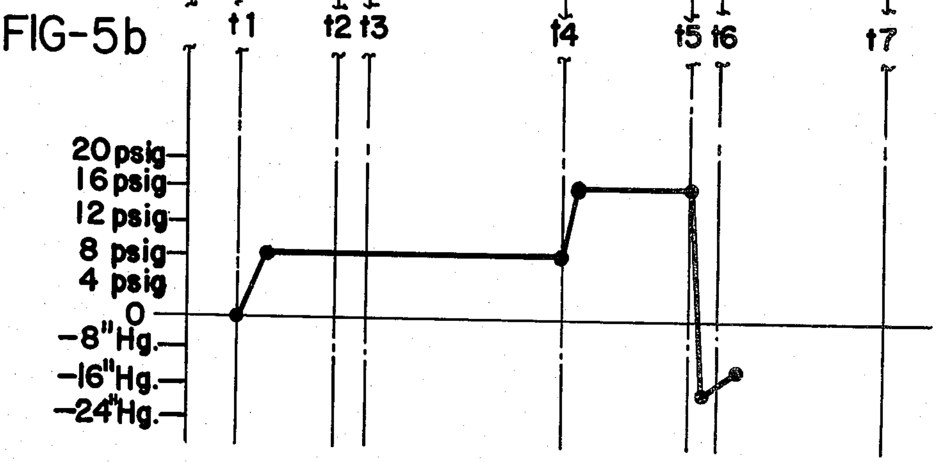

As seen in FIG. 5*b*, the pressure in the fluid reservoir 14 is quickly increased to 8 psi above ambient air pressure at start up of the printer by the application of start air. Although the cross flush valve 70 is open during start up, the flow restriction in conduit 74 provides sufficient back pressure in the reservoir 14 to keep the reservoir pressurized. When the cross flush valve 70 is closed at time t4, pressure in the fluid reservoir 14 increases to approximately 16 psi above ambient pressure and is maintained at this pressure level during printing.

At shut down of the bar, at time t5, the fluid supply valve 66 is closed and, simultaneously, exhaust valve 72 is opened. The pressure in the fluid reservoir 14 quickly drops to approximately 16 inches Hg below ambient pressure. Exhaust conduit 76 includes no flow restrictions and is connected to a partial vacuum line to produce this sudden pressure drop, which rapidly terminates flow of ink through the orifices 18 and prevents dripping of the ink on any of the printer elements. A short time later at time t6, drying air is supplied to the inlet 40 by means of dry air valve 68 to permit all of the fluid in the reservoir 14 and the outlet 44 to be exhausted through conduit 76. The dry air is supplied to the inlet 40 at approximately ambient pressure in order to prevent repressurization of the reservoir 14. Such repressurization could result in an undesirable formation of unstable fluid filaments by forcing the remaining ink in reservoir 14 through orifices 18. Valves 68 and 72 are held open until all of the ink is removed from the inlet 40, the outlet 44, and the reservoir 14. Valves 68 and 72 are then closed at time t7 and shut down is complete.

It should be appreciated that while the start up system of the present invention is shown as embodied in an ink jet printer having a row of orifices, the invention also may find application in an ink jet printer of the type having a single orifice which prints with one jet drop stream.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink jet printer for depositing ink drops on a print receiving medium, comprising:

print head means having a fluid receiving reservoir and including an orifice plate defining a row of orifices through which ink from said reservoir passes to form a row of downward extending fluid filaments, means for stimulating said fluid filaments to cause each of said fluid filaments to break up into a jet drop stream, a charge electrode plate positioned beneath said print head means and to one side of said row of fluid filaments, said plate including a plurality of charge electrodes, each of said electrodes positioned adjacent a respective one of said fluid filaments and spaced therefrom by a predetermined distance, ink supply inlet means for supplying ink to said fluid receiving reservoir in a direction substantially perpendicular to said row of orifices and to said fluid filaments, said ink supply inlet means being positioned on the same side of said fluid filaments as said charge electrode plate, ink supply outlet means for removing ink from said fluid receiving reservoir in a direction substantially perpendicular to said row of orifices and to said fluid filaments, said ink supply outlet means being positioned on the side of said fluid filaments opposite said ink supply inlet means, means for selectively applying charging potentials to said plurality of charge electrodes such that drops in said jet drop streams are selectively charged, means for providing a drop deflection field through which said jet drop streams pass, such that drops in said jet drop streams are separated into catch and print trajectories, means for catching drops in said catch trajectories while permitting drops in said print trajectories to strike said print receiving medium, and fluid supply control means for controlling the application of ink to and removal of ink from said fluid reservoir, whereby fluid flow across said row of orifices from said inlet means to said outlet means is provided at start up of said printer to deflect said filaments away from said charge electrodes by a distance greater than said predetermined distance, and whereby said fluid flow across said row of orifices is terminated after start up such that said fluid filaments are thereafter spaced from said electrodes by said predetermined distance, said fluid supply control means including means for providing a sufficient back pressure within said fluid receiving reservoir during flow from said inlet means to said outlet means at start up to produce fluid flow through said orifices and formation of said fluid filaments.

2. The ink jet printer of claim 1 in which said means for catching drops is positioned on the side of said fluid filaments opposite said charge electrode plate, whereby deflection of said filaments at start up causes drops formed therefrom to be directed to said means for catching drops.

3. The ink jet printer of claim 1 further comprising a source of ink, a source of start air, a source of dry air, and in which said fluid supply control means comprises first valve means for connecting said source of ink, said source of start air and said source of dry air to said ink supply inlet means.

4. The ink jet printer of claim 2 further comprising:

a cross flush conduit providing restricted flow of ink therethrough, an exhaust conduit, and in which said fluid supply control means comprises second valve means for connecting said cross flush conduit and said exhaust conduit to said ink supply outlet means.

5. An ink jet printer for printing on a print receiving medium comprising:

print head means defining a fluid reservoir and an orifice, and having a fluid inlet and a fluid outlet communicating with said reservoir, said fluid inlet and said fluid outlet being substantially aligned for fluid flow therebetween past said orifice such that fluid emerging from said orifice as a fluid filament has a velocity component in the direction of fluid flow between said fluid inlet and said fluid outlet, charge electrode means positioned adjacent said fluid filament on the side thereof closest to said fluid inlet, for selectively charging drops formed from said fluid filament, means for catching charged drops while permitting uncharged drops to strike said print receiving medium, and valve means for supplying ink to said fluid reservoir through said fluid inlet and removing ink from said fluid reservoir through said fluid outlet at start up of said printer to produce a fluid flow therebetween such that said fluid filament has a velocity component deflecting said fluid filament away from said charge electrode means, said valve means thereafter terminating said fluid flow past said orifice such that said fluid filament is undeflected, said valve means including means for providing a sufficient back pressure within said fluid reservoir during flow from said fluid inlet to said fluid outlet at start up to produce fluid flow through said orifice and formation of said fluid filament.

6. The ink jet printer of claim 5 in which said valve means comprises a first valve means for supplying ink to said inlet and a second valve means for removing ink from said outlet.

7. The ink jet printer of claim 5 in which said means for catching charged drops is positioned on the side of said fluid filament opposite said charge electrode means, whereby deflection of said filament at start up causes drops formed therefrom to be directed to said means for catching charged drops.

8. The ink jet printer of claim 6 in which said first valve means further comprises means for supplying start air to said fluid reservoir prior to the application of fluid thereto at start up of said printer.

9. The ink jet printer of claim 6 in which said valve means further comprises second valve means for removing ink from said fluid reservoir at start up of said printer.

10. The ink jet printer of claim 9 in which said first valve means further comprises means for supplying dry air to said fluid reservoir at shut down of said printer and said second valve means further comprises exhaust means for removing dry air and ink from said fluid reservoir at shut down of said printer.

11. A method of initiating operation of an ink jet printer having a print head defining a fluid reservoir and including an orifice plate defining a row of orifices, communicating with said reservoir, through which fluid from said reservoir flows to form a row of fluid filaments, said printing further having a charge plate positioned adjacent said row of fluid filaments and including a plurality of charge electrodes, each of said electrodes being associated with a respective one of said fluid filaments and spaced therefrom during operation of said printer by a predetermined distance, comprising the steps of:

supplying ink to said fluid reservoir at printer start up such that the ink flows parallel to said orifice plate past said orifices in a direction substantially perpendicular to said row of orifices while maintaining sufficient fluid pressure within said fluid reservoir to produce fluid flow through said orifices and formation of said fluid filaments, thereby imparting a velocity component to the fluid filaments, deflecting said filaments away from said charge plate such that said filaments are spaced from said electrodes by a distance greater than said predetermined distance, and thereafter terminating said flow of fluid past said orifices, whereby said filaments are spaced from said electrodes by said predetermined distance.

12. The method of claim 11 further comprising the steps of supplying air under pressure to said fluid reservoir at printer start up, prior to the application of ink thereto, such that the air flows parallel to said orifice plate past said orifice in a direction substantially perpendicular to said row of orifices and flows through said orifices in a direction away from said charge plate, and terminating application of air to said fluid reservoir immediately after initiation of application of ink thereto, whereby formation of said fluid filaments is enhanced.

* * * * *